United States Patent [19]

Ho et al.

[11] Patent Number: 5,930,393
[45] Date of Patent: Jul. 27, 1999

[54] METHOD AND APPARATUS FOR ENHANCING DEGRADED DOCUMENT IMAGES

[75] Inventors: Tin Kam Ho, Cedar Grove; John D. Hobby, Piscataway, both of N.J.

[73] Assignee: Lucent Technologies Inc., Murray Hill, N.J.

[21] Appl. No.: 08/909,388

[22] Filed: Aug. 11, 1997

[51] Int. Cl.$^6$ .............................. G06K 9/62; G06K 9/34; G06K 9/00; G06K 9/46

[52] U.S. Cl. ..................... 382/225; 382/170; 382/177; 382/191; 382/227; 382/218

[58] Field of Search ................................ 382/168, 169, 382/170, 171, 172, 174, 175, 177, 181, 224, 225, 226, 227, 228, 229, 288, 199, 289, 191, 218; 707/540, 541, 542

[56] References Cited

U.S. PATENT DOCUMENTS

| | | | |
|---|---|---|---|
| 5,315,668 | 5/1994 | O'Hair | 382/225 |
| 5,524,065 | 6/1996 | Yagasaki | 382/225 |
| 5,550,931 | 8/1996 | Bellegarda et al. | 382/225 |
| 5,577,135 | 11/1996 | Grajski et al. | 382/187 |
| 5,657,397 | 8/1997 | Bokser | 382/225 |
| 5,757,964 | 5/1998 | Lee et al. | 382/229 |
| 5,764,799 | 6/1998 | Hong et al. | 382/229 |
| 5,818,952 | 10/1998 | Takenouchi et al. | 382/229 |
| 5,818,965 | 10/1998 | Davies | 382/225 |
| 5,822,465 | 10/1998 | Normile et al. | 382/253 |
| 5,825,925 | 10/1998 | Baird et al. | 382/225 |

OTHER PUBLICATIONS

H. S. Baird, "Anatomy of a Versatile Page Reader," *Proceedings of the IEEE*, 80(7), 1059–1065 (Jul. 1992), Special Issue on OCR.

L. Guibas et al., "A Kinetic Framework for Computational Geometry," in *Proc. of the 24th Annual Symp. on Foundations of Computer Science*, 100–111 (1983).

T. K. Ho, "Random Decision Forests," in *Proceedings of the 3rd International Conference on Document Analysis and Recognition*, 278–282 (Aug. 1995), Montreal, Canada.

T. K. Ho et al., "Perfect Metrics," in *Proceedings of the Second International Conference on Document Analysis and Recognition*, 593–597 (Oct. 1993), Tsukuba Science City, Japan.

J. D. Hobby, "Smoothing Digitized Contours," in R. A. Earnshaw, Editor, *Theoretical Foundations of Computer Graphics and CAD*, 777–793, Springer Verlag (1988).

J. D. Hobby et al., "Degraded Character Image Restoration," in *Proceedings of the Fifth Annual Symposium on Document Analysis and Image Retrieval*, 233–245 (1996).

D. J. Ittner et al., "Language–free Layout Analysis," in *Proceedings of the Second International Conference on Document Analysis and Recognition*, 336–340 (1993), Tsukuba Science City, Japan.

S. Mori et al., "Research on Machine Recognition of Handprinted Characters," *IEEE Transactions on Pattern Analysis and Machine Intelligence*, PAMI–6(4), 386–405 (Jul. 1984).

(List continued on next page.)

*Primary Examiner*—Bipin H. Shalwala
*Attorney, Agent, or Firm*—Donald P. Dinella

[57] ABSTRACT

A technique for the enhancement of degraded document images to improve their display quality characteristics and image recognition accuracy. Images believed to be representative of the same symbol which occur in different positions over a image source (e.g., a facsimile page) are clustered together. Using the symbols within a particular cluster, an average character image outline for that cluster of symbols is derived and thereafter used to refine the matching of symbols within the cluster and to determine a final representative symbol for that cluster. The final representative symbols from the various resulting clusters are then used to replace all matching images throughout the image source. Advantageously, the display quality and recognition accuracy of the image source is enhanced after application of the present invention due to the resulting improvement of the images in the image source.

24 Claims, 5 Drawing Sheets

OTHER PUBLICATIONS

J. A. Nelder et al., "A Simplex Method for Function Minimization," *Computer Journal*, 7, 308–313 (1965).

S. V. Rice et al., "An Evaluation of OCR Accuracy," in *Information Science Research Institute, 1993 Annual Research Report*, 9–20 (1993), University of Nevada, Las Vegas.

Q. Zhang et al., "Bitmap Reconstruction for Document Image Compression," in *International Symposium on Voice, Video and Data Communications* (1996).

W. H. Press et al., "Numerical Recipes in C, The Art of Scientific Computing," Cambridge University Press, second edition, pp. 345–346, 1992.

FIG. 1

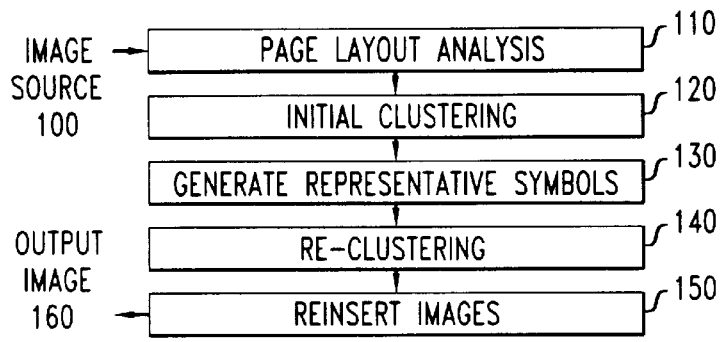

FIG. 2A

| CLUSTERING PROCEDURE | NO. OF GROUPS | AVERAGE GROUP SIZE |
|---|---|---|
| INPUT | 1 | 1555.0 |
| SORTING WITH IMAGE SIZE | 22 | 70.7 |
| SORTING WITH BLACK PIXEL SUM | 35 | 44.4 |
| SORTING WITH IMAGE WIDTH | 42 | 37.0 |
| SORTING WITH IMAGE HEIGHT | 44 | 35.3 |
| SORTING WITH ASPECT RATIO | 50 | 31.1 |
| SORTING WITH IMAGE DENSITY | 50 | 31.1 |
| EQUIVALENCE CLASSES | 98 | 15.9 |
| CLUSTERING BY HISTOGRAM | 119 | 13.1 |
| CLUSTERING BY CONTOUR | 223 | 7.0 |
| CLUSTERING BY PIXEL CORRELATION | 229 | 6.8 |
| CLUSTERING BY SUBSAMPLES | 253 | 6.1 |
| CLUSTERING BY STROKE DIR. DIST. | 295 | 5.3 |
| MERGING SINGLETONS | 287 | 5.4 |

RESULTS OF EACH CLUSTERING STEPS FOR AN EXAMPLE PAGE

FIG. 2B

```
uuuuu■vv■rrrr■rrr■rr
■11■1111■rr■rrrrr■r
r■cc■rrrr■ccc■ccccc
cc■rrrrrrrrrrrrrr■c
rr■rrrr■rrrrrrrrrrr
rrrrrrrrrrrrrrrr■cc
ccccccccccccc■ee■ss■
ss■sssssssss■ss■ss■
ssss■ssssssssssssss
■sss■sss■sss■sssssss
ssssssssssssssssss
■eeeeeeeeeeeeeeeee
eeeeeeee■ttttttttt
tttttttttttttt■ttttt
ttttttttttttt■2222■s
2■cc■ccccc■ccc■cccc
cc■eee■eeeeeeeeee■e
ee■eeeeeee■eeeeeeee
eeee■ss■eee■eeeeeee
eeeeee■ffff■ffff■ff
```

201
215
225
205
235
245

Example clusters extracted from a 200 dpi text page. Members of different clusters are separated by a black square.

So, we find special  
term rewriting for } 602

So, we find special  
term rewriting for } 604

| Id | OCR ERROR RATE | | | PERCENT IMPROVEMENT |
|---|---|---|---|---|
| | INPUT PAGES | OUTPUT PAGES | AFTER VOTING | |
| A | 7.2 | 6.6 | 5.9 | 18 |
| B | 4.4 | 4.8 | 3.9 | 11 |
| C | 1.8 | 2.0 | 1.7 | 6 |
| E | 3.7 | 2.8 | 2.3 | 38 |
| G | 13.5 | 12.0 | 11.0 | 19 |
| S | 14.1 | 13.8 | 11.7 | 17 |
| A' | 17.3 | 10.7 | 13.9 | 38 |
| B' | 12.2 | 8.3 | 7.7 | 37 |
| C' | 11.0 | 6.9 | 6.9 | 37 |
| E' | 20.7 | 11.1 | 11.0 | 47 |
| G' | 26.2 | 19.4 | 19.3 | 26 |
| S' | 31.5 | 21.8 | 20.7 | 34 |

METHOD AND APPARATUS FOR ENHANCING DEGRADED DOCUMENT IMAGES

FIELD OF THE INVENTION

The present invention relates to document image processing, and more particularly, to recognizing and enhancing the images from an image source, for example, a printed document.

BACKGROUND OF THE INVENTION

A fundamental problem in the art of automatic document image processing relates to image defects, that is, imperfections in the image as compared to the original ideal artwork used to create the image. The sources of image defects are numerous and well known. For example, the original printed document (e.g., paper document) which was the source of the image may be defective (e.g., the paper has spots of dirt, folds, or was printed from a faulty printing device). Further, when the paper document was scanned, the paper may have been skewed while being placed in the scanner, resulting in a distortion of the image. In addition, the optics of the scanning process itself can produce defects due to, for example, vibration, pixel sensor sensitivity or noise.

The above-mentioned image defects result in poor display quality of the image, e.g. a facsimile image, and are a particular problem in document image processing because of the character recognition accuracy required in the automatic processing of documents. For example, optical character recognition (OCR) is often an integral part of an image processing system. OCR is the process of transforming a graphical bit image of a page of textual information into a text file which can be later edited, for example, using word processing software. As is well known in the art, image classifiers are key components of most OCR systems used for analyzing a digital representation of an image. The accuracy of such OCR system classifiers significantly decreases when the quality of the image source is degraded even slightly.

Therefore, a need exists for a technique for the enhancement of degraded document images to improve their display quality characteristics and image recognition accuracy.

SUMMARY OF THE INVENTION

The present invention provides a technique for the enhancement of degraded document images to improve their image quality characteristics and image recognition accuracy. In accordance with the invention, images believed to be representative of the same symbol which occur in different positions over a image source (e.g., a facsimile page) are clustered together. Using the images within a particular cluster, a final representative symbol for that cluster is determined. Illustratively, the cluster's representative symbol is an average character image outline derived using bitmap averaging. The final representative symbols from the various resulting clusters are then used to replace the original images throughout the image source which match the representative symbol. Advantageously, the image quality and recognition accuracy of the image source are enhanced after application of the present invention due to the resulting improvement of the images in the image source.

More particularly, in accordance with an embodiment of the invention, page layout analysis is applied to a image source to identify skew and produce segmented characters. The segmented characters are initially clustered into separate groups of characters based upon their image similarities. Bitmap averaging is then applied to each of the clusters to obtain an average character image outline for the cluster. The individual character bitmaps within particular clusters are then compared to the average character image outline for that cluster. If a match occurs, the individual character bitmap remains in that cluster. If a mismatch occurs, that mismatched character bitmap is then compared to other average character image outlines from other clusters to determine if a match can be made. After the individual character bitmap comparisons, the clusters are then compared to each other to find potential merges of clusters. The average character image outlines resulting from the clustering operations are then used to replace the original images throughout the image source. Illustratively, this replacement is carried out by rasterizing the resulting representative average character image outline corresponding to each final cluster. Further, illustratively, the x and y coordinates of the location in the image source of each character (i.e., original image) within a cluster are saved during the initial clustering, and thereafter used to insert the corresponding rasterized image outline at the particular location of the original image within the image source. Advantageously, the quality of the image source is increased from both a display and recognition standpoint.

BRIEF DESCRIPTION OF THE DRAWINGS

FIG. 1 is a flowchart of the preferred embodiment of the image enhancement process of the present invention;

FIG. 2A shows example clustering results after applying the initial clustering operation of FIG. 1;

FIG. 2B shows selected symbols from the clusters identified in FIG. 2A;

DETAILED DESCRIPTION

Figure 3:
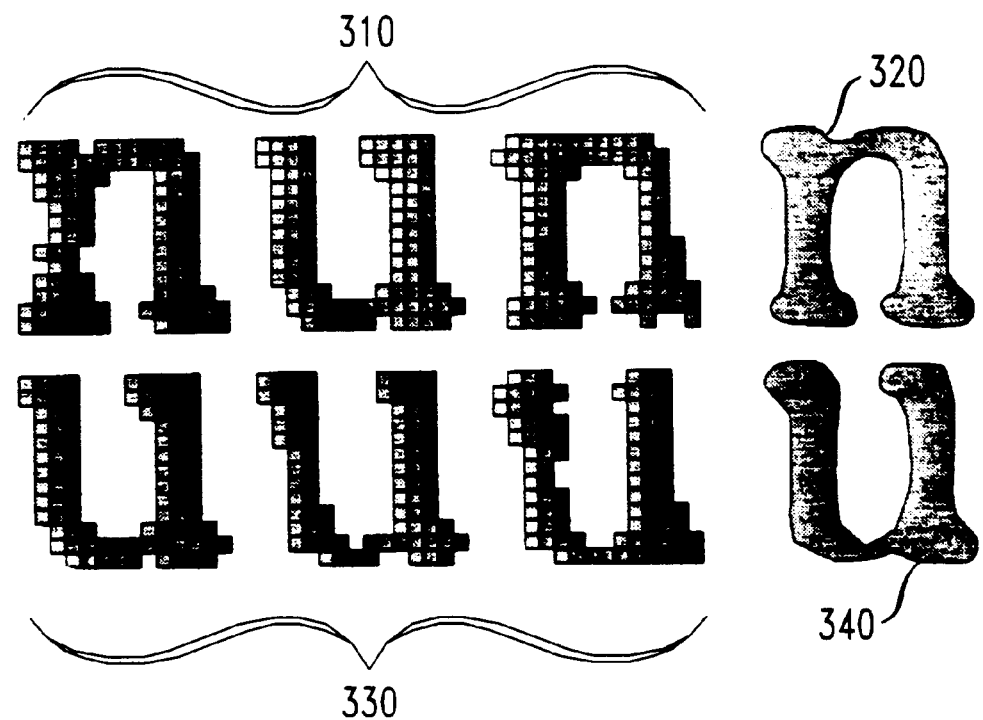
FIG. 3 shows an illustrative example of applying the bitmap averaging operation of FIG. 1.

The present invention provides a technique for the enhancement of degraded document images to improve their image quality characteristics and image recognition accuracy. In accordance with the invention, images believed to be representative of the same symbol which occur in different positions over a image source (e.g., a facsimile page) are clustered together. Using the images within a particular cluster, a final representative symbol for that cluster is determined. Illustratively, the cluster's representative symbol is an average character image outline (alternatively referred to herein as "the image outline" or "the outline") derived using bitmap averaging. The representative symbol is an improved image (i.e., the image quality is improved) as compared to the individual images within a cluster. These average character image outlines are thereafter used to replace particular ones of the original images in the image source as will be further discussed hereinafter. Advantageously, the image quality and recognition accuracy of the image source are enhanced after application of the present invention due to the resulting improvement of the character images in the image source.

FIG. 1 is a flowchart of the main operations of the preferred embodiment of the present invention. In accordance with the embodiment, image source 100 (e.g., text from a facsimile page) undergoes page layout analysis (block 110) to, at a minimum, detect and correct for skew effects of image source 100 and for performing character segmentation on image source 100. Page layout analysis and character segmentation techniques are well known, see for example, H. S. Baird, "Anatomy of A Versatile Page Reader", *Proceedings of the IEEE-Special Issue on OCR*, 80(7):1059–1065, July, 1992, and D. J. Ittner et al., "Language-free Layout Analysis", *Proceedings of the Second International Conference of Document Analysis and Recognition*, pp. 336–440, 1996.

The character images generated from the character segmentations of image source 100 undergo an initial clustering (block 120) to identify images believed to be the same character (i.e., symbol) which are scattered across image source 100. In accordance with the embodiment of the invention, this initial clustering is accomplished in a series of three stages which progressively divide all the characters of image source 100 into clusters of decreasing sizes. The initial clustering is done in stages to improve the overall performance of the image matching technique which is further discussed below. Advantageously, as the groups become smaller in size more complex matching techniques may be applied without a significant degradation in performance. More particularly, in the first stage, a single image measure is used to describe the characteristics of a particular type of character image. This single measure is used to sort all the character images of image source 100. Illustratively, we have identified six different image measures which are particularly useful in this aspect of the present embodiment of the invention. These six image measures are as follows:

1. image size (sz): ncols×nrows;
2. sum of black pixels (sb): $\sum_{i=1}^{nrows}\sum_{j=1}^{ncols} I(i,j)$;
3. image width (wth): ncols;
4. image height (hgt): nrows;
5. aspect ratio (asp): nrows/ncols; and
6. image density (den): sb/sz.

In accordance with the embodiment, as multiple image measures are employed, these image measures are applied such that the character images are sorted within the groups found from the previous pass. For example, turning our attention to FIG. 2A, the numerical results 200 of applying the first stage clustering to image source 100 are shown. For this illustrative example, a randomly selected page of printed text from a technical article was used as image source 100. As shown, input 210 consists of a single group (i.e., cluster) of 1555 characters. The first stage clustering results 220 show a progressive increase in the number of groups 240 with a corresponding decrease in the average group size 250 resulting from sequentially applying the image measures as discussed above.

After applying the image measures to sort the characters of image source 100 into particular clusters, the initial clustering (see, FIG. 1, block 120) is continued in a second stage which finds "equivalence classes" to further refine the clustering of the individual images of image source 100. In accordance with this embodiment of the invention, the similarity relation (≡) for two images, illustratively $I_1$ and $I_2$, is defined as follows:

Let $d_1=|sz(I_1)-sz(I_2)|$, $d_2=|hgt(I_1)-hgt(I_2)|$, $d_3=|wth(I_1)-wth(I_2)|$ such that $I_1 \equiv I_2$ if $d_1<t_1$ and $d_2<t_2$ and $d_3<t_3$ where $t_1$, $t_2$ and $t_3$ are predefined thresholds. This similarity relation is used as input to the well known "eclazz( )" algorithm described in detail, for example, in W. H. Press et al., *Numerical Recipes in C, The Art of Scientific Computing*, Cambridge University Press, second edition, pp. 345–346, 1992. Basically, the eclazz( ) algorithm is used as a computational tool to find the equivalence classes corresponding to the transitive closure of the similarity relation (e.g., $d_1$ defined above). In accordance with the embodiment, the similarity relation is passed to the following eclazz( ) algorithm:

```
void eclazz(int nf[], int n, int (*equiv)(int, int))
{
    int kk, jj;
    nf[1]=1;
    for (jj=2; jj<=n; jj++){
        nf[jj]=jj;
        for (kk=1; kk<=(jj-1); kk++) {
            nf[kk]=nf[nf[kk]];
            if((*equiv) (jj,kk)) nf[nf[nf[kk]]]=jj;
        }
    }
    for (jj=1; jj<=n; jj++) nf[jj]=nj[nf[jj]];
}
```

Further, in accordance with the embodiment, the equivalence class clustering is applied directly to the final group from the first stage clustering. For example, in FIG. 2A, equivalence classes 230 resulted in a total clustering of 98 groups with an average group size of 15.9.

The final clustering stage in the initial clustering step (see, FIG. 1, block 120) employs a conventional hierarchical clustering known as "complete-linkage" clustering which uses integer-valued feature vectors compared by Euclidean distance. The feature vectors are illustratively derived using the images resulting from the second stage clustering with individual images being normalized to a 16×16 pixel grid. Illustratively, the preferred embodiment of the invention employs five different feature vectors:

1. Histogram: This is a concatenation of the vertical and horizontal projection profiles taken on four half images. The image area is first divided into upper and lower halves, and a vertical projection profile (i.e., counting the number of black pixels in each column) is computed for each. Similarly, the image is divided into left and right halves, and a horizontal projection profile is obtained from each half. These four profiles are concatenated to form a vector with 64 components (i.e., 16×4), with each component feature being an integer in the range [0, 8]. The histogram feature vector is further described in T. K. Ho et al., "Perfect Metrics", *In Proceedings of the 3rd International Conference on Document Analysis and Recognition*, pp. 593–597, Tsukuba Science City, Japan, October, 1993.
2. Contour: The contour features are distances from each of the four edges of the bounding box to the character's outer contour. For each column, a distance is calculated from the upper edge of the box to the first black pixel of the column, and from the lower edge to the last black pixel. Similarly for each row, a distance is calculated from the left edge to the leftmost black pixel, and from the right edge to the rightmost black pixel. These distances form a vector of 64 components (i.e., 16×4) with each component being an integer in the range [0,16]. The contour feature vector is further described in T. K. Ho et al., supra.

3. Pixel correlation: These are conjunctions and disjunctions of neighboring pixels in various directions such that for a given pixel $I(i,j)$ at row i and column j:

$H(i,j)=I(i,j)\char`\^I(i,j+2)$ horizontal neighbor
$V(i,j)=I(i,j)\char`\^I(i+2,j)$ vertical neighbor
$N(i,j)=I(i,j)\char`\^I(i+2,j+2)$ NW-SE diagonal neighbor
$S(i,j)=I(i,j)\char`\^I(i+2,j-2)$ SW-NE diagonal neighbor and
$H'(i,j)=H(i,j)vH(i+1,j)vH(i+2,j)vH(i+3,j)$
$V'(i,j)=V(i,j)vV(i,j+1)vH(i,j+2)vH(i,j+3)$
$N'(i,j)=N(i,j)vN(i+1,j-1)vN(i+2,j-2)$ v $N(i+3,j-3)$
$S'(i,j)=S(i,j)vS(i+1,j+1)vS(i+2,j+2)vS(i+3,j+3)$, where ^ is the binary AND, and v is the binary OR operation. The feature vector is a concatenation of the well defined values of $H'(i,j)$, $V'(i,j)$, $N'(i,j)$ and $S'(i,j)$ for each $(i,j)$. Illustratively, for an image of 16×16 pixels this feature vector has 268 binary components. The pixel correlation feature vector is further described in T. K. Ho et al., "Random Decision Forests", *In Proceedings of the 3rd International Conference on Document Analysis and Recognition*, pp. 278–282, Montreal, Canada, August, 1995.

4. Subsamples: These are values of subsampling the normalized image down to one-fourth of the normalized size, and then repeating the process until the image is reduced to one single pixel. Illustratively, for an image source of 16×16 pixels, this feature vector has 85 integer components.

5. Stroke detection distribution: The stroke detection features are computed by run-length analysis. Illustratively, for each black pixel, a length of black pixel runs (as extended in the four directions: horizontal, NE-SW diagonal, vertical and NW-SE diagonal) containing the pixel is calculated. The pixel is labeled with the direction in which the run length is at a maximum. The image area is partitioned in square regions and the number of pixels of each of the four types is counted for each region. These pixel counts are stored as the feature vector. The stroke detection feature vector is further described in S. Mori et al., "Research on machine recognition of handprinted characters", *IEEE Transactions on Pattern Analysis and Machine Intelligence*, PAMI-6(4):386–405, July, 1984.

Again, turning our attention to the illustrative example of FIG. 2A, the results of applying the feature vectors as described above are shown in third stage clustering results 260. As shown, the number of groups has increased to a total of 295 with an average group size of 5.3.

It should be noted that in accordance with the embodiment, during the various stages of the initial clustering, once two images (i.e., characters or symbols) are separated into different clusters they will remain so separated in each subsequent clustering step. Further, after the third stage of the initial clustering, it is advantageous to identify particular single images which do not belong to any existing cluster and merge such images with an existing cluster. These non-matching single images are termed "singletons". Illustratively, the singleton merging operation uses a similarity relation similar to that as described previously with regard to the second stage of the initial clustering. However, in the merging of singletons the similarity relation is defined on size-normalized images such that two images are considered equivalent if their Hamming distance is less than a predetermined threshold value. As is well known, a Hamming distance is not a physical distance but is a specific measure of the difference between two binary numbers. Hamming distance is defined in the general case as the number of bit positions in which a pair of binary words differ. Hamming distances are further described, for example, in John Watkinson, *Art of Digital Video*, second edition, Focal Press, pp. 351–355, 1994. Referring back to numerical results 200 (see, FIG. 2A), if a threshold value of 15 is selected for the Hamming distance comparison, merging singleton results 270 shows a reduction in the number of groups to 287 with an average group size of 5.4.

FIG. 2B shows example clusters 215, 225, 235 and 245 (individual clusters are separated by black square 201) which were identified in accordance with the above-described initial clustering operations of the embodiment and were extracted from the clusters identified in FIG. 2A. As one can see from the entire set of clusters 205, the initial clustering is effective in grouping similar characters, however there are some font confusions, and mismatched symbols within certain clusters (e.g., digit "1" vs. letter "l" and digit "2" vs. letter "s").

Having initially clustered the input character images as illustratively described above, the preferred embodiment of the invention further improves upon the initial clustering by seeking to ensure that the characters within a cluster are truly matching. In particular, generate representative symbols operation (see, FIG. 1, block 130) is employed to generate a representative symbol for each cluster. In accordance with the embodiment, bitmap averaging is used to generate an average character image outline for each cluster. The average character image outline serves as the representative symbol for that cluster and will be used to improve the image quality of the source as further described below. Bitmap averaging is described in more detail in J. D. Hobby et al., "Degraded Character Image Restoration", *In Proceedings of the Fifth Annual Symposium on DocumentAnalysis and Image Retrieval*, pp. 233–245, 1996, which is hereby incorporated by reference for all purposes. The use of bitmap averaging allows for the derivation of a high quality average character image outline for each cluster identified during the initial clustering. The average character image outline is used to ensure that the characters within a given cluster are matching, and ultimately, to improve the image quality of the image source in accordance with the invention. The improvement of the initial clustering through the use of the representative symbols is realized in re-clustering operation in FIG. 1, block 140, and is further discussed below. Illustratively, re-clustering operation 140 of the preferred embodiment uses three basic steps to achieve further cluster improvement:

(1) Apply bitmap averaging to the character bitmaps in cluster C (cluster C is defined as a set of character bitmaps) to yield enhanced character image outline A. Let n be the number of character bitmaps in C;

(2) Find all bitmaps in C that match A and output the matching bitmaps as a new cluster and remove them from C. If the number of bitmaps remaining in C falls below a predetermined threshold (e.g., 90%) then continue applying bitmap averaging; and (3) Output each remaining unmatched character bitmap in C as a singleton cluster. For each singleton cluster, try to find a non-singleton cluster whose outline A matches. If a match is found, merge that singleton into the matching non-singleton cluster.

The above steps (1)–(3) will now be discussed in more detail using an example involving 48 character images selected from a 200×200 dpi facsimile page. The facsimile page of this example was the same page of printed text used to generate the clustering results of FIG. 2A and FIG. 2B. The 48 character images included 34 "n's" and 14 "u's" having varying fonts. FIG. 3 shows a select set 310 of the 48 character images which were clustered in accordance with the invention. After applying bitmap averaging, as described above, the average character image outline 320 is obtained for this original cluster of 48 character images.

Figure 4:
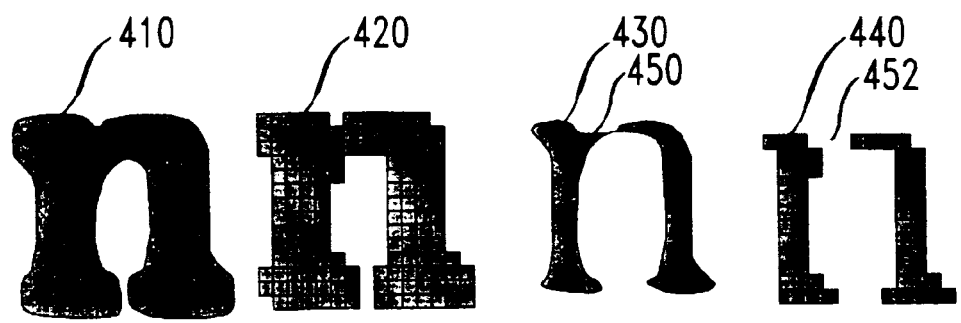
FIG. 4 is an example of expanding, contracting and rasterizing the average character image outline shown in FIG. 3.

We found that certain character adjustments can be made in order to more effectively match the average character image outline 320 with the input character images. Illustratively, an expansion of the average character image outline 320 and a rasterization of this expanded version of the outline are considered. Advantageously, the expansion of the average character image outline is illustratively accomplished by considering a region S which describes the image outline and expanding the outline as follows: $S \oplus B_\epsilon$, where $B_\epsilon$ is the set of points with max $(|x|,|y|) \leq \epsilon$, and $\oplus$ denotes the Minkowski sum such that $S \oplus B_\epsilon = \{s+b | s \in S \text{ and } b \in B_\epsilon\}$. Minkowski sums are well known and described in more detail, for example, in Joseph O'Rourke, *Computational Geometry in C*, Cambridge University Press, pp. 278–282, 1994. FIG. 4 shows an example of expanding and rasterizing the average character image outline 320 of FIG. 3. As shown in FIG. 4, expanding the average character image outline 320 as described above with $\epsilon = \frac{1}{2}$ results in expanded outline 410. Illustratively, the selection of $\epsilon$ is made to generate an optimal number of clusters and enhance the accuracy of the matching operations. Rasterizing expanded outline 410, in accordance with the embodiment, results in rasterized image 420 which is used for clustering. In particular, input character images (e.g., character images 310 shown in FIG. 3) are compared to, for example, rasterized image 420 and those character images whose black pixels match that of rasterized image 420 are clustered together as representing the same character. The expansion and rasterization procedure allows for the effective use of the average character image outline during re-clustering operation 140 and increases the accuracy of the clustering of the present invention.

We have also found that a further increase in the effectiveness of character matching is achieved by not only matching the black pixels of images as described above, but also by checking the location of white pixels in the character images. In accordance with the embodiment, in order to check and verify the location of white pixels a contraction operation is performed on the average character image outline. Again, as described above, S is a region which describes the image outline and the contraction is performed as follows: $S - B_\epsilon = c(c(S) \oplus B_\epsilon)$ where $c(S)$ denotes the set complement. This contraction operation effectively reduces the black areas of the image outline. For example, applying the above-described contraction operation to average character image outline 320 results in contracted image 430 shown in FIG. 4. As done in the expansion operation, a rasterization of contracted image 430 is made which results in rasterized image 440. Thus, a match for clustering purposes between a particular character image and the average character image outline is made whenever the black pixels of the character image match the rasterized expansion of the average character image outline and the white pixels match the rasterized contraction of the average character image outline.

The aforementioned operations improve the effectiveness of character matching primarily by operating on the average character image outlines. While this proves very effective in most instances there are certain cases where erroneous matching results may occur due to, for example, the contraction of the outlines. That is, the contraction of the average character image outline can cause certain "thin strokes" of the character outlines to disappear (thereafter referred to as "missing strokes"). For example, character region 450 in contracted image 430 shows the creation of such a "thin stroke" in the contracted image. Subsequently, a "missing stroke" appears as character region 452 in rasterized image 440. Ideally, character bitmaps from the original image which have "missing" strokes should be rejected during the matching operations to ensure that the character bitmaps are not incorrectly identified as a particular matching character outline. Therefore, in accordance with a further embodiment of the invention, a series of expansion and contraction operations are performed on the character bitmaps and average character image outlines to address these "thin" strokes as previously described. These expansion and contraction operations are applied through containment tests as follows:

(a) $C \subseteq \text{rast}(S \oplus B_{\epsilon 1})$;

(b) $C \supseteq \text{rast}(S - B_{\epsilon 2})$;

(c) $C \oplus B_{\delta 3} \supseteq \text{rast}(S \oplus B_{\delta 3 - \epsilon 3})$ where $\delta_3 = \lceil 2\epsilon_3 + 1 \rceil / 2$; and (d) $C - B_{\delta 4} \subseteq \text{rast}(S - B_{\delta 4 - \epsilon 4})$ where $\delta_4 = \lceil 2\epsilon_4 \rceil / 2$.

By applying these expansion and contraction operations we can then determine that character bitmap, e.g., C, matches the average character image outline, e.g., the image outline corresponding to the character region S, if the containment tests (a) through (d) hold true.

As mentioned previously, singleton clusters may result from the matching operations used in clustering the character images in accordance with invention. Of course, it is desirable to minimize the total number of clusters and to that end it is desirable to match any singleton clusters with non-singleton clusters if appropriate. As before, in accordance with the preferred embodiment, bitmap averaging is used to compute an average character image outline for each non-singleton cluster. The following steps are used in our preferred embodiment to match singleton clusters with non-singleton clusters: p1 (1) Use bitmap averaging to compute an average character image outline for each non-singleton cluster;

(2) If all singleton clusters have been processed then stop. Otherwise, let C be the character bitmap for the next unprocessed singleton cluster;

(3) Compare C to the average character image outline for each non-singleton cluster using tolerances $\epsilon_1$ through $\epsilon_4$ and record the number of violating pixels. By violating pixels, we mean the total number of pixels which did not match during the aforementioned expansion and contraction operations (see, containment tests (a)–(d) above) on the character bitmaps and outlines. If the number of violating pixels is zero, assign C to that non-singleton cluster and go to step (2);

(4) Compare C to the outlines for each non-singleton cluster using tolerances $\epsilon_1 + \bar{\epsilon}$ through $\epsilon_2 + \bar{\epsilon}$. If there are any matches, assign C to the matching non-singleton cluster that had the fewest violating pixels; and (5) go to step (2).

Applying the above-described operations to singleton clusters substantially reduces the total number of clusters. We have found for a typical 200 dpi test page that a reduction of approximately 45% is achievable by merging singleton clusters in accordance with the above-described embodiment of the invention.

Furthermore, another benefit of substantially reducing the total cluster count by merging singletons is that algorithms used to find equivalence classes, such as the eclazz( ) algorithm previously discussed, can be applied to further improve clustering in accordance with the invention. More particularly, smaller cluster counts facilitate the use of a quadratic algorithm based on a comparison function (e.g., the eclazz( ) algorithm) that examines the average character image outlines for two particular clusters at a time and determines if they match. For example, if A and A' are outlines to be compared (with corresponding point sets $\overline{A}$ and $\overline{A}'$ respectively) using the eclazz( ) algorithm, a determination that the two outlines match is made when A and A' match to within $\epsilon_0$ if each vertex of A is within Euclidean distance $\epsilon_0$ of a point in $\overline{A}'$ and each vertex of A' is within distance $\epsilon_0$ of a point in $\overline{A}$. Thus, if A matches A', and A' matches a third outline A", the eclazz( ) algorithm assumes that A matches A". As a result, outlines A, A' and A" are clustered together.

Resulting from the above-described re-clustering operation is an average character image outline which serves as a representative symbol for each identified cluster. These average character image outlines are then used to replace particular degraded images (i.e., characters) in the image source through a reinsert operation (see, FIG. 1, block 150). As will be appreciated, the replacement of the degraded images with that of the representative symbols can be accomplished in a number of ways. Illustratively, in accordance with an embodiment of the invention, upon the initial clustering of the original images as described previously, the x and y coordinates of the location of the original image in the image source are saved for each image within a cluster. Further illustratively, reinsert images operation 150 rasterizes the resulting average character image outline (i.e., representative symbol) from each final cluster to form an individual character bitmap and uses the rasterized individual character bitmap for replacing the original image. The previously saved x and y coordinates are used for identifying the location of the specific original images in the image source from a given cluster which are to be replaced by the corresponding representative symbol (now in rasterized form). To increase the accuracy of the image replacing of reinsert images operation 150, the centroids of the individual character bitmaps can be compared to the centroids of the original images (at their defined x and y coordinate positions within the image source) to determine an exact location for replacing the original image with the representative symbol. Advantageously, the quality of the image source is increased from both a display and recognition standpoint.

Figures 5, 6A, 6B:
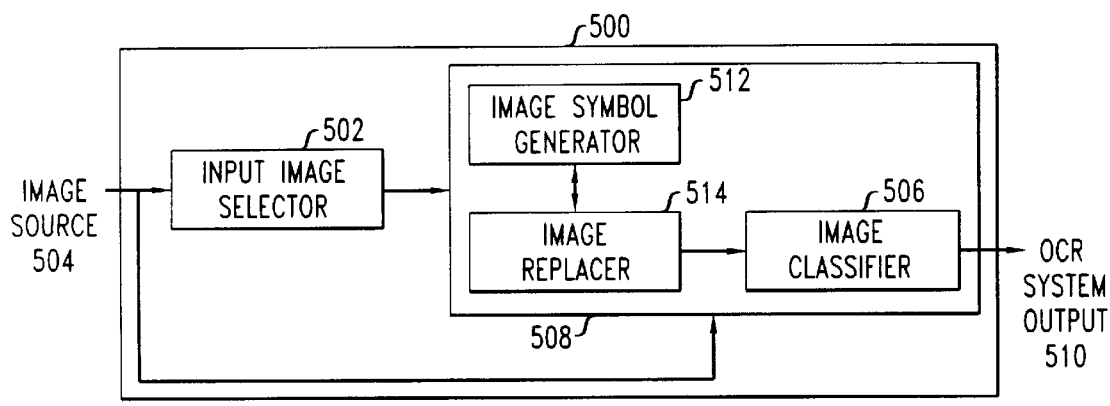
FIG. 5 shows an OCR system for use with the image enhancement process of the present invention.
FIG. 6A shows a select portion of a facsimile image prior to application of the present invention.
FIG. 6B shows a select portion of the facsimile image of FIG. 6A after application of the present invention.

The advantages of the present invention are of particular import in image processing applications, for example, optical character recognition. FIG. 5 shows an illustrative OCR system in which the advantages of the invention can be realized. In particular, OCR system 500 has an input image selector 502 which is used to select an input set of images, illustratively a set of printed characters, from image source 504. Illustratively, image symbol generator 512 and image replacer 514, both shown illustratively as part of OCR engine 508, work in conjunction to perform the clustering, symbol generation and image enhancement operations of the invention as detailed above. Advantageously, an improved set of images is provided to image classifier 506. Image classifier 506, illustratively shown as part of OCR engine 508, is used to classify images from the original image source. The classifications made by image classifier 506 are then used by OCR engine 508 which applies well known image recognition principles to image source 504 to produce well known OCR system output 510. The invention can be used to improve OCR accuracy, such as in OCR system 500, in particular with respect to the better image quality and the clustering of character images which share common symbol identity. To further quantify these advantages, we employed the invention in a test using 28 fine mode facsimile pages (200×200 dpi) and 20 standard mode facsimile pages (200× 100 dpi).

FIGS. 6A and 6B illustrate the image quality before (see, FIG. 6A) and after (see, FIG. 6B) application of the present invention to scale a 200×200 dpi facsimile image to 600 dpi. As shown in FIG. 6A, the facsimile images 602 contain a variety of defects which contribute to their poor image quality. As is apparent from facsimile images 604 in FIG. 6B, the image quality has been improved after application of the invention as evidenced by the smoother image outlines and improved image clarity.

Figures 7, 8:
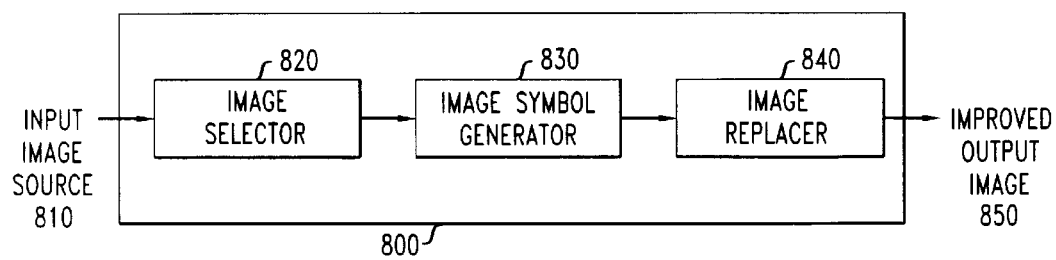
FIG. 7 shows image recognition results of applying the invention in an OCR context.
FIG. 8 shows an apparatus for applying the invention to improve the image quality of a image source.

In addition to improving the overall image quality, we further tested OCR accuracy using commercially available OCR software such as Adobe Acrobat Capture Version 1.0. The input images were the 28 fine mode facsimile pages (200×200 dpi) and 20 standard mode facsimile pages (200× 100 dpi) as detailed above. Due to Acrobat Capture's inability to process non-square aspect ratios, the 200×100 dpi input pages were scaled vertically by a factor of two using a well known outline-based technique as described in detail in J. D. Hobby, "Smoothing Digitized Contours", *Theoretical Foundations of Computer Graphics and CAD*, Springer Verlag, pp. 777–793, 1988. The OCR results 700 obtained from this test are shown in FIG. 7. The input for the test consisted of separate documents with each document having multiple pages of textual content. The individual documents are identified in results 700 by the column labeled "Id" 712. For comparison purposes, FIG. 7 shows the OCR error percentage rate 702 for images from input pages 704 which were unprocessed and input directly to the OCR software. We next applied the present invention in two different manners. First, the aforementioned principles and operations of the invention were used to enhance the input image sources and thereafter the OCR software was applied to these improved images. The resulting OCR error rates after applying the invention are shown as output pages 706. As one can see from these results, the OCR error rates are improved in almost all cases from that of the unprocessed input pages 704 results.

We next applied the present invention in a so called "majority voting" manner which used not only the enhanced images generated in accordance with the invention but took advantage of the clustering information collected in applying the invention. That is, using the clustering information a "majority vote" (i.e., a comparison between character clusters and character bitmaps generated in accordance with the invention) can be taken for each cluster of characters among the OCR results and a correction can be made to the OCR results that do not agree with the "majority vote". The reduced OCR error percentage rates generated by majority voting are show in FIG. 7 as after voting 708, and further illustrate the advantages of clustering of character images in accordance with the invention. In particular, the percent improvement results 710 indicate significant reductions in OCR error rates when employing the invention as compared to input pages 704 which used the standard OCR engine of the Adobe Acrobat software.

In addition to the aforementioned OCR application, the advantages can further be applied in, for example, an apparatus which will produce an improved output image, in accordance with the invention, from an input image source. Illustratively, the apparatus can serve as a standalone system to produce the improved output, or serve as part of another apparatus, for example, a facsimile machine. As a standalone system, the apparatus can enhance, for example, various types of printed documents which are of poor original quality. The user would simply process the document through the apparatus and, in accordance with the principles of the invention described above, receive an output image which has improved image quality. FIG. 8 shows a block diagram of such an illustrative image improvement apparatus 800 which receives as input image source 810, for example, a degraded page of printed text. Image selector 820 selects particular images from input image source 810 for clustering in accordance with the invention. Image symbol generator 830 and image replacer 840 work in conjunction to perform the clustering, symbol generation and image enhancement operations in accordance with the invention, as described above. Thus, improved output image 850 has an improved image quality (e.g., a higher image resolution) as compared to input image source 810.

The foregoing merely illustrates the principles of the present invention. Those skilled in the art will be able to devise numerous arrangements which, although not explicitly shown or described herein, embody those principles and are within their spirit and scope.

We claim:

1. A method for enhancing the image quality of a degraded image source having a plurlity of images, the method comprising the steps of:

clustering particular images, the particular images being representative of a same symbol occurring in different positions across the degraded image source, from the plurality of images of the degraded image source into a cluster, the clustering being performed as a function of sorting the plurality of images using an image measure to form an initial cluster, the image measure describing particular quantitative characteristics of a single image type;

generating a representative symbol for the cluster from the particular images within the cluster; and replacing at least one image from the plurality of images with the representative symbol.

2. The method of claim 1 wherein the clustering step includes character segmentation.

3. The method of claim 1 wherein the clustering step includes the steps of:

identifying a plurality of equivalence classes in the initial cluster, at least one equivalence class being identified as a function of a image similarity relation between at least two images of the plurality of images, and using the identified equivalence classes to form a secondary cluster from the initial cluster; and using a plurality of feature vectors derived from the secondary cluster to form the cluster.

4. The method of claim 3 wherein the initial cluster includes more images than the secondary cluster and the cluster, and the secondary cluster includes more images than the cluster.

5. The method of claim 2 wherein the representative symbol is an average character image outline.

6. The method of claim 5 wherein the average character image outline is formed using bitmap averaging.

7. A method for enhancing the image quality of a degraded image source having a plurality of images, the method comprising the steps of:

generating a plurality of clusters from the plurality of images, each cluster comprising particular ones of the images which are selected on the basis of being representative of a same symbol occurring in different positions across the degraded image source as determined as a function of sorting the plurality of images using a series of image measures to form an initial cluster, each image measure of the series describing particular quantitative characteristics of a single image type;

generating a plurality of representative symbols from the plurality of clusters, each one of the representative symbols corresponding to a single one of the clusters;

comparing at least one of the representative symbols to at least one other representative symbol, and if a match occurs, merging the clusters whose corresponding representative symbols match; and replacing at least one image of the plurality of images with at least one of the representative symbols.

8. The method of claim 7 wherein in the generating a plurality of clusters step each cluster of the plurality of clusters is generated by the further steps of:

identifying a plurality of equivalence classes in the initial cluster at least one equivalence class being identified as a function of a image similarity relation between at least two images of the plurality of images, and using the identified equivalence classes to form a secondary cluster from the initial cluster; and using a plurality of feature vectors derived from the secondary cluster to form the cluster.

9. The method of claim 7 further comprising the steps of:

identifying singleton clusters from the plurality of clusters; and merging the singleton clusters with non-singleton clusters from the plurality of clusters.

10. The method of claim 8 including the further step of:

comparing the particular ones of the images within the cluster with the representative symbol corresponding to the cluster and, if a mismatch occurs, removing the mismatched particular one image from the cluster.

11. The method of claim 7 wherein the representative symbol is an average character image outline derived through bitmap averaging.

12. The method of claim 8 wherein the plurality of equivalence classes are determined using a comparison function.

13. The method of claim 1 or 7 wherein the degraded image source is a printed document.

14. The method of claim 8 wherein at least one of the feature vectors is selected from the group consisting of: histogram, contour, pixel correlation, subsamples and stroke detection distribution.

15. An optical character recognition apparatus for enhancing the image quality of a degraded image source the optical character recognition apparatus comprising:

a selector for selecting a first plurality of images from the degraded image source;

a image symbol generator for clustering particular images, the particular images being representative of a same symbol occurring in different positions across the degraded image source, from the first plurality of images into a cluster, the clustering of the particular images being preformed as a function of sorting the first plurality of images using an image measure to form an initial cluster, the image measure describing particular quantitative characteristics of a single image type, and generating a representative symbol for the cluster from the particular images within the cluster;

a image replacer for replacing at least one image from the first plurality of images with the representative symbol thereby creating a second plurality of images; and an image classifier for classifying the second plurality of images.

16. The apparatus of claim 15 wherein the image symbol generator identifies a plurality of equivalence classes in the initial cluster, at least one equivalence class being identified as a function of a image similarity relation between at least two images of the first plurality of images, and uses the identified equivalence classes to form a secondary cluster from the initial cluster, and uses a plurality of feature vectors derived from the secondary cluster to form the cluster.

17. The apparatus of claim 15 wherein the representative symbol is an average character image outline.

18. The apparatus of claim 17 wherein the average character image outline is derived through bitmap averaging.

19. The apparatus of claim 15 wherein the degraded image source is a printed document.

20. The apparatus of claim 15 wherein the second plurality of images has a higher image resolution than the first plurality of images.

21. An apparatus for enhancing the image quality of a degraded image source having a plurality of images, the apparatus comprising:

a selector for selecting the plurality of images from the degraded image source;

a image symbol generator for clustering particular images, the particular images being representative of a same symbol occurring in different positions across the degraded image source, from the plurality of images into a cluster, the clustering of the particular images being performed as a function sorting the plurality of images using a series image measures, each image measure of the series describing particular quantitative characteristics of a single image type, and generating a representative symbol for the cluster from the particular images within the cluster; and a image replacer for replacing at least one of the images from the plurality of images with the representative symbol.

22. The apparatus of claim 21 wherein, prior to the replacing, the image replacer performs a comparison between a centroid of the representative symbol and a centroid of the at least one of the images from the plurality of images.

23. The apparatus of claim 21 wherein the representative symbol is an average character image outline formed by bitmap averaging.

24. The apparatus of claim 23 wherein the degraded image source is a printed document.

* * * * *